United States Patent [19]
Bode et al.

[11] 4,250,081
[45] Feb. 10, 1981

[54] THERMOPLASTIC MIXTURES FOR THE PRODUCTION OF SYNTHETIC RESIN FILMS WITH ANTIBLOCKING PROPERTIES COMPRISING A THERMOPLASTIC SYNTHETIC RESIN AND A PULVERULENT ZEOLITE

[75] Inventors: Rudolf Bode, Bad Orb; Arthur Reisert, Kahl; Günter Türk, Hanau; Hans Strack, Alzenau, all of Fed. Rep. of Germany

[73] Assignee: Deutsche Gold- und Silber-Scheideanstalt vormals Roessler, Hanau, Fed. Rep. of Germany

[21] Appl. No.: 60,127

[22] Filed: Jul. 24, 1979

[30] Foreign Application Priority Data

Aug. 1, 1978 [DE] Fed. Rep. of Germany ....... 2833675

[51] Int. Cl.³ .............................................. C08L 23/02
[52] U.S. Cl. .............................. 260/42.46; 260/40 R
[58] Field of Search ........................... 260/42.46, 40 R

[56] References Cited

U.S. PATENT DOCUMENTS

| | | | |
|---|---|---|---|
| 2,882,243 | 4/1959 | Milton | 252/455 |
| 3,809,671 | 5/1974 | Okawa et al. | 260/42.46 |
| 3,962,157 | 6/1976 | Nakano et al. | 260/42.46 |
| 4,029,631 | 6/1977 | Bollen et al. | 260/40 R |
| 4,073,867 | 2/1978 | Roebke et al. | 423/429 |

*Primary Examiner*—Maurice J. Welsh
*Attorney, Agent, or Firm*—Cushman, Darby & Cushman

[57] ABSTRACT

There are provided thermoplastic polymer containing mixtures suitable for making synthetic resin films with antiblocking properties containing 0.05 to 70 weight % of a pulverulent zeolite.

29 Claims, 5 Drawing Figures

PARTICLE SIZE DISTRIBUTION (COULTER COUNTER) — ZEOLITE P

PARTICLE SIZE DISTRIBUTION (COULTER COUNTER) — ZEOLITE A

PARTICLE SIZE DISTRIBUTION (COULTER COUNTER)

ZEOLITE X

PARTICLE SIZE DISTRIBUTION (COULTER COUNTER)

ZEOLITE Y

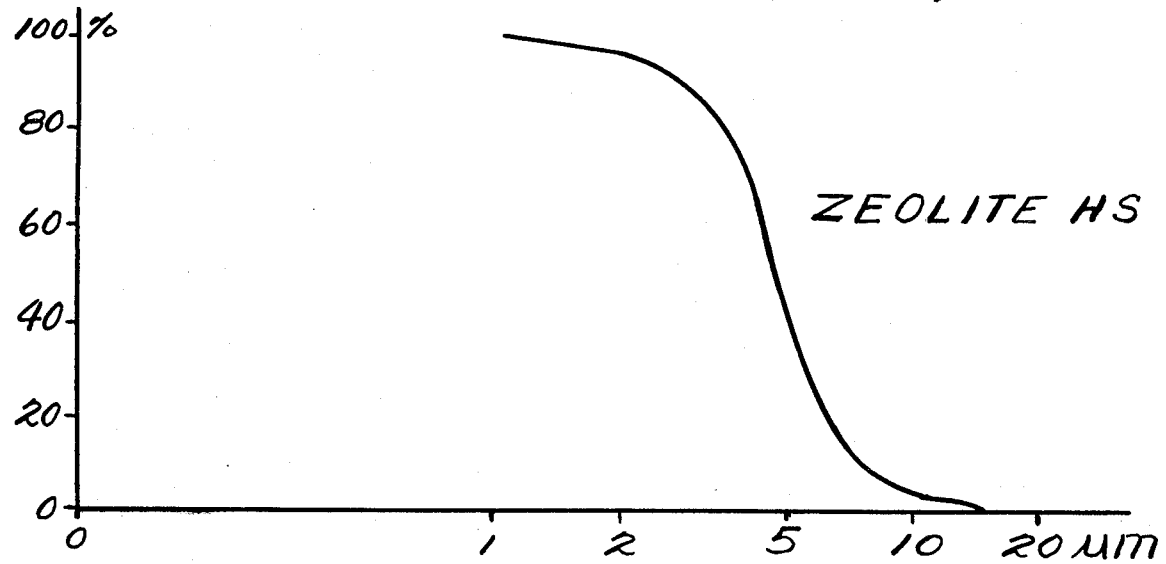

THERMOPLASTIC MIXTURES FOR THE PRODUCTION OF SYNTHETIC RESIN FILMS WITH ANTIBLOCKING PROPERTIES COMPRISING A THERMOPLASTIC SYNTHETIC RESIN AND A PULVERULENT ZEOLITE

BACKGROUND OF THE INVENTION

The invention is directed to thermoplastic mixtures suitable for the production of synthetic resin films having antiblocking properties.

In the production of, e.g., flexible tube films from thermoplastic synthetic resins or synthetic resin mixtures a melt of these thermoplastic mixtures is extruded through a circular slot nozzle to form a flexible tube, this is blown, cooled, laid flat and wound up.

It is known in the production of films as a particularly important requirement to provide that there is prevented the blocking of the films.

Thus according to German AS No. 1 210 177 (UCC) (corresponding to Mock U.S. application Ser. No. 679,534, filed Aug. 21, 1957) now abandoned there is known a process for production of non-blocking, transparent polyethylene films in which a finely divided $SiO_2$ containing material with a particle size of 0.5 to 7 microns is kneaded into the extruding mixture through which there can be prevented a blocking of the films.

According to this German AS No. 1 210 177, there can be added as $SiO_2$ containing materials diatomaceous earth, commercial silica and silica gel whose particle size distribution lies within this range.

From Bollen U.S. Pat. No. 4,029,631, it is known to mix an amorphous silicon dioxide into polyethylene terephthalate as an antiblocking agent.

From German AS No. 1 232 337 (Kurashiki Rayon Co.) it is known in the production of film tapes from polyvinyl alcohol to dust on the surfaces of both film tapes a block preventing powder consisting of water free silica with a degree of purity of 99.9% and a particle size of 4 to 13 millimicrons.

From German AS No. 1 247 641 (UCC) (corresponding to Gardner U.S. application Ser. No. 333,206, filed Dec. 24, 1963) abandoned, it is known to Knead into thermoplastic mixtures for the production of films from polyethylene as fillers diatomaceous earth, commercial silica, silicates, silica gel, silica-alumina and asbestos.

However, the known thermoplastic mixtures have the disadvantage that they contain as antiblocking agent materials which must be made nearly free from water in expensive drying processes prior to their being kneaded into the thermoplastic mixture, since the presence of moisture in the thermoplastic mixture causes the formation of blisters or bubbles at the stated processing temperatures.

The problem of the present invention was to find a thermoplastic mixture with an inorganic filler which in a synthetic resin film exhibits a good anti-blocking effect and whose inorganic filler components do not need to be dried to a water free condition.

SUMMARY OF THE INVENTION

According to the invention, there are prepared thermoplastic mixtures for the production of synthetic resin films with antiblocking properties in which the thermoplastic mixtures contain 0.05 to 70 weight % of a pulverulent or powdery zeolite or mixture of zeolites.

In a preferred form of the invention, the thermoplastic mixtures contain as a master batch over 2 to 60 weight %, especially 20 to 60 weight % of a pulverulent zeolite. In a further preferred form, the thermoplastic mixtures of the invention, e.g., as so-called films, contain 0.05 to 2 weight %, especially 0.05 to 1.0 weight % of a pulverulent zeolite.

In a preferred form of the invention, the thermoplastic mixtures contain a pulverulent zeolite whose particles have a particle size of 0.5 to 20 microns, preferably 0.5 to 10 microns whereby there can be used as the method of determination, e.g., the Coulter-Counter method. This particle size can be attained by the precipitation process of synthesizing the zeolite and/or later by grinding.

The concept "zeolite" corresponds to the description of D. W. Breck, "Zeolite Molecular Sieves", Wiley Interscience, 1974, pages 133 to 180. The added zeolites can have a water content of up to 27%.

As pulverulent zeolites, thermoplastic mixtures of the invention can contain a zeolite of Type A. The Type A zeolite has the general formula

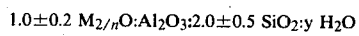

$$1.0\pm0.2\ M_{2/n}O:Al_2O_3:2.0\pm0.5\ SiO_2:y\ H_2O$$

where M is a metal cation such as, e.g., sodium or potassium cation (or calcium, lithium or magnesium), n is its valence and y has a value up to 5.

Preferably the thermoplastic mixtures can contain a zeolite of Type A which are produced according to the process of German AS No. 2 333 068 (and related Roebke U.S. application Ser. No. 684,191, filed May 7, 1976 and now abandoned), German AS No. 2 447 021 (and related Roebke U.S. application Ser. No. 617,394, filed Sept. 29, 1975), German AS No. 2 517 218 (and related Roebke U.S. Pat. No. 4,073,867), German OS No. 26 51 485 (and related Strack U.S. application Ser. No. 846,015, filed Oct. 27, 1977), German OS No. 26 51 445 (and related Strack U.S. application Ser. No. 846,016, filed Oct. 27, 1977), German OS No. 26 51 436 (and related Strack U.S. application Ser. No. 846,017, filed Oct. 27, 1977), German OS No. 26 51 419 (and related Strack U.S. application Ser. No. 846,014, filed Oct. 27, 1977), German OS No. 26 51 420 (and related Strack U.S. application Ser. No. 846,012, filed Oct. 27, 1977), and/or German OS No. 26 51 437 (and related Strack U.S. application Ser. No. 846,013, filed Oct. 27, 1977). The entire disclosures of the above-mentioned published German applications, Roebke U.S. patent and Roebke and Strack U.S. applications mentioned in this paragraph are hereby incorporated by reference and relied upon. The added zeolite A also can be produced by other known processes, e.g., according to German Pat. No. 1 038 017 (and related Milton U.S. Pat. No. 2,882,243) or German AS No. 1 667 620. The entire disclosures of these last three publications are hereby incorporated by reference and relied upon.

Preferably the added zeolite A can have the following physical-chemical data:

| Particle Size Distribution: (Coulter-Counter) | Portion | <15 microns: 99–100 weight % <br> <10 microns: 95–99 weight % <br> <1 micron: 5 weight % |
|---|---|---|
| Loss on heating according to DIN 55 921 (German Industrial Standard): | | <24% |

Furthermore, the thermoplastic mixtures according to the invention can contain as pulverent zeolites a zeolite of Type Y with the general formula $$0.9 \pm 0.2\ M_{2/n}O:Al_2O_3:XSiO_2:y\ H_2O$$

where M is a metal cation, such as, e.g., sodium or potassium cation, n is its valence, X has a value greater than 3 and y has a value up to 9.

The added zeolite Y can have the following physical-chemical properties:

| Loss on heating according to DIN 55 921 | <27% |
|---|---|
| Particle size distribution (Coulter-Counter): | |
| Portion   <15 microns: 96–100 weight % | |
|   <10 microns: 85–99 weight % | |
|   <1 micron: <20 weight % | |

These zeolite molecular sieve powders can be produced for example according to German AS No. 1 098 929, German AS No. 1 203 239 (corresponding to Breck U.S. application Ser. No. 109,487, filed May 12, 1961) and German AS No. 1 273 506. The entire disclosures of the German applications mentioned in this paragraph are hereby incorporated by reference and relied upon.

Furthermore, according to the invention, the thermoplastic mixtures can contain as pulverent zeolites a zeolite of Type X with the general formula $$0.9 \pm 0.2\ M_{2/n}:Al_2O_3:2.5 \pm 0.5\ SiO_2:y\ H_2O$$

where M is a metal cation, e.g., sodium or potassium cation (or calcium, strontium or barium), n is its valence and y has a value up to 8.

These powdery zeolites can be produced according to German Pat. No. 1 038 016, German Pat. No. 1 138 383 or German OS No. 20 28 163. The entire disclosures of the German publications mentioned in this paragraph are hereby incorporated by reference and relied upon.

The added zeolite X can have the following physical-chemical properties:

| Loss on heating (DIN 55 921) | <27% |
|---|---|
| Particle size distribution (Coulter-Counter): | |
| Portion   <15 microns: 96–100 weight % | |
|   <10 microns: 85–99 weight % | |
|   <1 micron: 20 weight % | |

Preferably the thermoplastic mixtures of the invention can contain as pulverent zeolite of Type P. The designation zeolite P is synonymous with the designation Phillipsite and zeolite B. For example, the zeolite P can be produced according to the process of French Pat. No. 1,213,628 (Bayer AG). The entire disclosure of this French publication is hereby incorporated by reference and relied upon.

The added zeolite P can have the following physical-chemical properties:

| Loss on heating (DIN 55 921) | <15 weight % |
|---|---|
| Particle size distribution (Coulter-Counter): | |
| Portion   <15 micrometers: 99–100 weight % | |
|   <10 micrometers: 97–99 weight % | |
|   <1 micrometer: 20 weight % | |

The thermoplastic mixtures of the invention furthermore can contain as pulverent zeolite hydroxysodalite with the general formula $$Na_2O.Al_2O_3.2\ SiO_2.2.5\ H_2O.$$

Hydroxysodalite can be produced, for example, from zeolite A by boiling in aqueous sodium hydroxide (see D. W. Breck, "Zeolite Molecular Sieves", page 275 (1974), Wiley Interscience Publications. The entire disclosure of Breck is hereby incorporated by reference and relied upon.

The added hydroxysodalite can have the following physical-chemical properties:

| Loss on heating (DIN 55 921) | <15 weight % |
|---|---|
| Particle size distribution (Coulter-Counter): | |
| Portion   <15 micrometers: 99–100 weight % | |
|   <10 micrometers: 90–99 weight % | |
|   <1 micrometer: 10 weight % | |

In a further illustrative form of the invention, the thermoplastic mixtures of the invention can contain a mixture of the stated zeolites. These mixtures can be produced either through mixtures of the pure zeolites or through direct synthesis by means of the precipitation process. Mixtures which can be produced directly can be mixtures of zeolite A and P, of zeolite A and X, of zeolite A and hydroxysodalite, of zeolite P and X or zeolite P and Y. In a preferred form of the invention, the thermoplastic mixtures can contain a mixture of zeolite X and zeolite P in the ratio of 80 to 5% X to 20 to 95% P. The other mixtures, for example, can be in the same range.

This type of mixture, for example, can be produced according to German OS No. 20 28 163, page 15, Table 3, Example 3 by means of a precipitation process.

The thermoplastic mixtures can contain polyethylene with the following properties:

Density: 0.90 to 0.95 g/cm$^3$:

Melt flow index (MFI): 3–25 g/10 min at 190° C. and 2.15 kp load.

In a further illustrative form, the thermoplastic mixtures of the invention can contain as the synthetic resin a polymerisate or polycondensate as, e.g., poly(ethylene terephthalate).

In a further illustrative form of the invention, the thermoplastic mixtures can contain polypropylene. This is generally characterized by a density of more than 0.900 g/cm$^3$ and normally by a density between 0.915 and 0.960 g/cm$^3$. The polypropylenes suited for the invention have a melt index of 0.1 to 60 g/10 minutes, preferably 1.2 to 7.0 g/10 min. (at 230° C. and 5.0 kp load).

However, there can also be used mixtures of polyethylenes in the mixtures of the invention, and in such mixtures there can even be used polyethylene waxes.

Both the polyethylenes and the polypropylenes can contain customary additives which normally are incorporated to make the thermoplasts resistant to heat, air, oxygen and damage by light. Stabilizers of this type among other include carbon black, 2,2-thiobis(4-methyl-6-tert.-butylphenol), dilaurylthiodipropionate as well as various other known amine and phenol stabilizers.

The thermoplastic mixtures of the invention can contain copolymerizates of ethylene and copolymerizable vinyl monomers.

Suitable copolymerizates of ethylene and a copolymerizable vinyl monomer (with the group —C'=C'—) contain as vinyl monomers, e.g., vinyl aryl compounds such as styrene, p-methoxy styrene, m-methoxy styrene, o-methoxystyrene, o-nitrostyrene, m-nitrostyrene, o-methylstyrene, p-methylstyrene, m-methylstyrene, α-methylstyrene, p-phenylstyrene, o-phenylstyrene, m-phenylstyrene and vinyl naphthalene, e.g., α-vinyl naphthalene; vinyl and vinylidene halides such as vinyl chloride, vinylidene chloride, vinyl fluoride and vinylidene fluoride; vinyl esters such as vinyl acetate, vinyl propionate, vinyl butyrate, vinyl chloroacetate, vinyl chloropropionate, vinyl stearate, vinyl benzoate and vinyl chlorobenzoate; acrylic and α-alkyl acrylic acids, their alkyl esters, their amides and their nitriles such as acrylic acid, chloracrylic acid, methacrylic acid, ethacrylic acid, methyl acrylate, ethyl acrylate, butyl acrylate, n-octyl acrylate, 2-ethylhexyl acrylate, n-decyl acryl, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethylmethacrylamide, acrylonitrile, chloroacrylonitrile, methacrylonitrile and ethacrylonitrile; alkyl esters of maleic and fumaric acid such as dimethyl maleate, diethyl maleate, dibutyl maleate, dimethyl fumarate; vinyl alkyl ethers, vinyl isobutyl ether, 2-chloroethyl vinyl ether, vinyl alkyl ketones such as methyl vinyl ketone, ethyl vinyl ketone and isobutyl vinyl ketone, likewise vinyl pyridine, N-vinyl carbazole, N-vinyl pyrrolidone, methyl ethyl vinyl acetamide, ethyl methylene malonate and propylene.

Preferably the mixed polymerisates used are mix polymerisates (copolymers) of ethyl and vinyl acetate (EVA) as well as ethylene and propylene.

The fillers suited for the invention have a particle size of 0.5 to 20 microns. Preferably the particle size of the fillers should be between 0.5 and 10 microns. This particle size leads to surfaces free from spots with good antiblocking properties.

The mixtures of the invention likewise can contain additional conventional additives such as lubricants and pigments.

Synthetic resin films can be produced from the thermoplastic mixtures of the invention if the individual components are mixed together in a suitable mixing apparatus, e.g., in an internal mixer of the "Banbury" type at a suitable temperature. Subsequently, the thus obtained thermoplastic mixture can be diluted by further addition of synthetic resin to a content of 0.05 to 1 weight % of pulverulent zeolite, in a given case in the same mixing apparatus, and, e.g., by means of an extruder-blowing apparatus blown at suitable temperature to thin films.

The mixtures of the invention have the advantage that they contain as antiblocking agent a pulverulent zeolite, which in spite of a water content of up to 27 weight % in the production of the thermoplastic mixture even at temperatures of over 170° C. do not form disturbing gas bubbles through the steam set free in the thermoplastic mixture. This property makes the zeolite of the silica gel and precipitated silica superior whose physically bound water escapes at 105° C. and which, therefore, previously must be dried to a very low water content and must be protected before introducing the air moisture by a special packing. In comparison to diatomaceous earth, this superiority merely concerns the fact of the preliminary drying and less the point of view of the special packing.

The thermoplastic mixtures of the invention furthermore can contain up to 70 weight % of the zeolitic antiblocking agent, whereby the space-time yields of the expensive kneader apparatus are better utilized and the process of production of the anti-blocking agent-master batch, is carried out more economically. While the products of the state of the art, e.g., silica gel and precipitated silica because of their higher thickening effect can be mixed into the thermoplastic mixture to a maximum of 25–30 weight %, with diatomaceous earth nevertheless amounts of filler up to 50 weight % are produced. In this important point, it is shown, therefore, that the mixture or mixtures of the invention clearly exceed those which contain silica gel and precipitated silica, and somewhat exceed those which contain diatomaceous earth.

In evaluating the efficiency of an antiblocking agent, its dispersability in the thermoplastic mixture plays a decisive role. Hereby there is shown the superiority of the zeolite as antiblocking agent component of the thermoplastic mixtures of the invention. Because of the outstanding dispersability of the zeolite antiblocking agent of the invention, not only is the time of kneading the thermoplastic mixtures considerably shortened and thereby the space-time yields of the kneading process increased, but there is also eliminated the danger that the antiblocking agent aggregate is broken down under the action of the shearing forces, which leads to a shifting of the average particle size, which is accompanied by a breakdown of the antiblocking agent.

According to the particle structure and freedom from large particles of the powdery zeolites added of the invention, these develop in the mixture in comparison to the products of the state of the art a very slight abrasiveness, through which the kneader will be exposed to less abrasive forces in the production of the thermoplastic mixtures. This particularly is true in the comparison to the diatomaceous earths which have a relatively high abrasiveness because of their high quartz content.

The zeolite A added according to the invention in extensive toxicological inhalation and toxicological investigation was classified unobjectionable. Although this statement is also true for silica gels and precipitated silicas in contrast thereto there are observed for the diatomaceous earth containing up to several percentages of quartz intensified protective measures for the service personnel in the processing (MAK-value at 4 mg/Nm$^3$).

The fineness and particle distribution of the zeolites added according to the invention besides the good dispersability guarantees freedom from spots and high quality to the surface of the films. No products of the state of the art attained this kind of a good surface structure.

In the working in the kneader a zeolitic molecular sieve powder inclines less to dusts because of its high water content of up to 27 weight % whereby the operating conditions of the environmental protection provisions are able to be maintained correspondingly easily.

Surprisingly, it has been found that the thermoplastic mixtures of the invention or the films prepared therefrom absorb nearly no moisture from the air.

BRIEF DESCRIPTION OF THE DRAWINGS

FIG. 5 is the graph of the particle size distribution of the hydroxysodalite added in Example 4.

Figure 1:
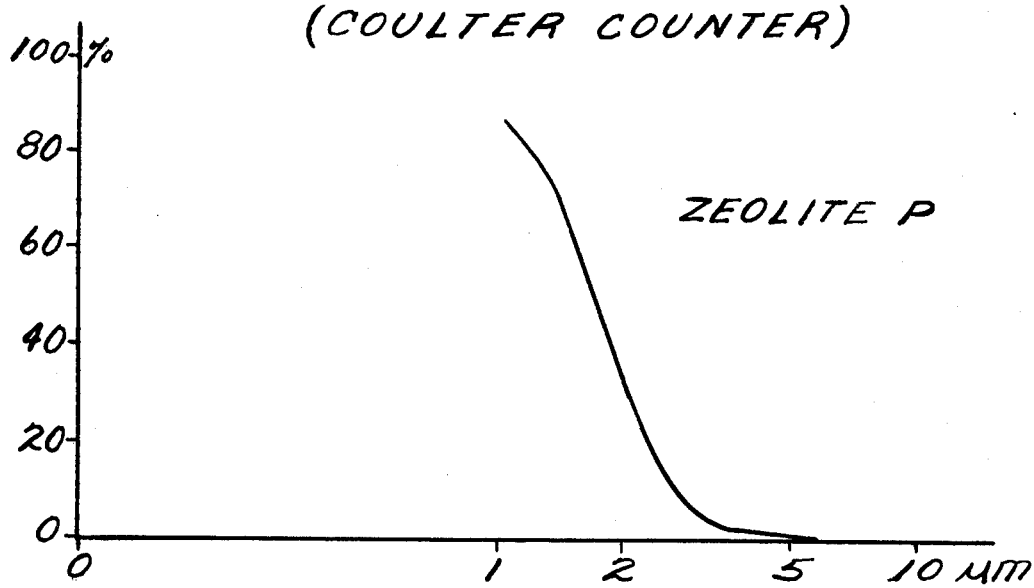
FIG. 1 is the graph of the particle size distribution of the zeolite P added in Examples 2 and 3.

Unless otherwise indicated all parts and percentages are by weight.

The composition can comprise, consist essentially of or consist of the materials set forth.

EXAMPLE 1

| Polyethylene Mark Used | For Concentrate | For Films |
| --- | --- | --- |
| LUPOLEN-Mark | 1800 S | 3010 K |
| Density [g/cm$^3$] | 0.915–0.918 | 0.932–0.939 |
| MFI* [g/10 min] | 17–22 | 3.4–4.6 |

*at 190° C. and 2.16 kp load (DIN 53 735)

Production of Concentrate 250 grams of LUPOLEN 1800 S were melted within 5 minutes on a set of mixing rolls of the firm Schwabenthan (roll dimension 200×400 mm) at a temperature of 130° C. and roll speeds of 15 to 18 rpm. After a smooth running rolled sheet had been produced in a further 5 minutes there were mixed in 250 grams of zeolite A in 2 portions wherein after the first portion of zeolite A the rolled sheet was rolled to a cocoon and broken up. Subsequently, the mixture while being broken up 5 times was dispersed for 3 minutes and drawn to a sheet about 2 mm thick. The breaking up of the rolled sheet containing 50% of antiblocking agent to chopped granulate took place on a saw mill over a 6 mm sieve.

Production of Films 8 grams of concentrate was diluted with 3992 grams of LUPOLEN 3010 K, corresponding to 0.1% antiblocking agent, by simple mixing of the granulate. The film production was undertaken on an extruder having a screw 45 mm in diameter and a nozzle diameter of 100 mm. At a nozzle temperature of 170° C. there was produced a film having a flat deposited width of about 250 mm and a thickness of 0.04 mm.

Tests

Tests of the Concentrate

The melt flow index MFI gives information of the changes of the rheological behavior of the polymer melts caused by the antiblocking agent. The measurement was carried out according to DIN 53 735. There were chosen as test conditions a temperature of 190° C. and a load of 5 kp. There was sought that the melt flow index of the concentrate was in the same order of magnitude or higher than the melt flow index of the LDPE added for the production of the film (in the present example 11 g/10 min at an increased test load of 5 kp instead of 2.16 kp).

Tests on the Films

Under blocking there is understood by those in the art the property of two similar contacting films only being able to be separated again using more or less force. The measurement can take place in a peeling experiment by measuring the force required to separate the films. A further measure of the blocking properties is the coefficient of sliding. This size is exactly taken by a gauge for the displaceability of two films contacting each other, however, usable figures in the comparison are produced in hand separation experiments.

The peeling experiment was carried out relying on ASTM-D 1893. For this purpose there were placed together a pair of films of the size 250×120 mm, loaded with 20 g/cm$^2$ and stored for 24 hours at 60° C. The films were subsequently separated with the help of the apparatus described in ASTM-D 1893, while they were drawn over a bar which was slipped between the contacting sheets. The force necessary for this was designated the blocking force and measured in grams.

A measurement of the coefficient of sliding was made relying on DIN 53 375. For this purpose a strip of film 200×300 mm was spread out on a glass plate, another piece of film 50×50 mm laid thereon, loaded and drawn off with a feed of 100 mm/min. As the load weight there was employed a metal cylinder having a pressure surface of 10 cm$^2$ and a weight of 200 grams. The sliding coefficient is obtained by the division of tensile strength/contact pressure.

TABLE 1

| | Test Results | | |
| --- | --- | --- | --- |
| | Melt Index MFI* g/10 min | Blocking Strength g | Slipping Coefficient μ |
| Concentrate | 16 | — | — |
| LUPON 3010 K | 11 | | |
| Film without additive | | 35 | 1.3 |
| Film with 0.1% zeolite A | | 0 | 0.7 |

*Measured at 190° C. and 5 kp load

The results ascertained showed that the zeolite A completely destroyed the blocking force and considerably reduced the coefficient of slipping.

EXAMPLE 2

Production of Sample

According to the operating procedure described in Example 1, there were compared zeolites A and P with the precipitated silica FK 310 and the silica gel Syloid 244. For this purpose first there were produced concentrates, in each case with 20% of the named products. The reduction of the concentration took place with consideration of the comparison products. For the production of films in place of LUPOLEN 3010 K there was used LDPE LUPOLEN 2430 H.

| | LUPOLEN 2430 H |
| --- | --- |
| Density g/cm$^3$ | 0.923–0.925 |
| MFI* g/10 min | 1.6–2.2 |

*at 190° C. and 2.16 kp load

TABLE 2

| | Test Results | | | |
| --- | --- | --- | --- | --- |
| | Concentrate | | | |
| Antiblocking Agent | Concentration [%] | MFI* [g/10 min] | Concentration [%] | Films Coefficient of Slipping |
| None | — | ** | — | 1.3 |
| Zeolite P | 20 | 48 | 0.1 | 0.7 |
| Zeolite A | 20 | 43 | 0.1 | 0.6 |

TABLE 2-continued

| Antiblocking Agent | Concentrate Concentration [%] | MFI* [g/10 min] | Concentration [%] | Films Coefficient of Slipping |
|---|---|---|---|---|
| FK 310 | 20 | 12 | 0.1 | 0.5 |
| Syloid 244 | 20 | 2.5 | 0.1 | 0.6 |

*Measured at 190° C. and 5 kp load
**LUPOLEN 2430 H: MFI = 6 [g/10 min]

The measured values entered in Table 2 show that with this low density polyethylene (LPDE) also very good antiblocking properties were obtained by addition of the zeolites. The numbers for the melt flow index of the concentrate besides allows the recognition of the strongly improved flow behavior in comparison to precipitated silica FK 310 and particularly compared to silica gel Syloid 244.

EXAMPLE 3

Production of Samples

There were produced concentrates, in each case with 30%, of the following products using the procedure described in Example 1. Zeolite A, Zeolite P, Zeolite X, Zeolite Y, Hydroxysodalite, diatomaceous earth Celite Superfloss, precipitated silica FK 310, silica gel Syloid 385.

TABLE 3

| Antiblocking Agent | Concentrate Concentration [%] | MFI* [g/10 min] | Concentration [%] | Films Coefficient of Slipping |
|---|---|---|---|---|
| None | — | ** | — | 1.0 |
| Zeolite A | 30 | 34 | — | — |
| " | — | — | 0.1 | 0.5 |
| " | — | — | 1.0 | 0.4 |
| Zeolite P | 30 | 35 | — | — |
| " | — | — | 0.1 | 0.65 |
| " | — | — | 1.0 | 0.5 |
| Zeolite X | 30 | 24 | — | — |
| " | — | — | 0.1 | 0.55 |
| " | — | — | 1.0 | 0.45 |
| Zeolite Y | 30 | 32 | — | — |
| " | — | — | 0.1 | 0.7 |
| " | — | — | 1.0 | 0.45 |
| Hydroxysodalith | 30 | 31 | — | — |
| " | — | — | 0.1 | 0.5 |
| " | — | — | 1.0 | 0.4 |
| Celite Superfloss | 30 | 20 | — | — |
| " | — | — | 0.1 | 0.6 |
| " | — | — | 1.0 | 0.5 |
| FK 310 | 30 | 1.8 | — | — |
| " | — | — | 0.1 | 0.5 |
| " | — | — | 1.0 | 0.4 |
| Syloid 385 | 30 | 2.0 | — | — |
| " | — | — | 0.1 | 0.5 |
| " | — | — | 1.0 | 0.4 |

*Measured at 190° C. and 5 kp load
**LUPOLEN 2430 H: MFI = 6 g/10 min

The results collected in Table 3 again show the very good effectiveness of the products of the present invention as antiblocking agents and the advantageous behavior reference to lower melt viscosity (lower thickening effect).

EXAMPLE 4

Production of Samples

To ascertain the highest possible degree of filling, there were produced concentrates of 20 to 70% of the products Zeolite A, precipitated silica FK 310, silica gel Syloid 385 and diatomaceous earth Celite Superfloss.

TABLE 4

| Concentration | MFI* [g/10 min] | | | Celite Superfloss |
|---|---|---|---|---|
| | Zeolite A | FK 310 | Syloid 385 | |
| 20 | 43 | 0 | 11 | 35 |
| 30 | 34 | 1.8 | 2.0 | 20 |
| 40 | 25 | <0.1 | <0.1 | 11.5 |
| 50 | 16 | | | 6.5 |
| 60 | 7.5 | | | 2.3 |
| 70 | 1.7 | | | 0.1 |

*Measured at 190° C. and 5 kp load

In Table 4 there is clearly established the superiority of Zeolite A to the comparison products.

For the equipment polyethylene having a MFI of 6 [g/10 min] (e.g., LUPOLEN 2430 H) with antiblocking properties there thus result from Table 4 the following limiting concentrations for the antiblocking agent in the concentrate.

| Antiblocking Agent | Limiting Concentration % |
|---|---|
| Zeolite A | 60 |
| FK 310 | 20–30 |
| Syloid 385 | 20–30 |
| Celite Superfloss | 50 |

The silica FK 310 used in the examples is a precipitated silica with the following physical-chemical properties:

Loss on drying according to DIN 55 921: 2.5 weight %

Loss on heating according to DIN 55 921: 5.0 weight % pH according to DIN 53 200: 7

Tamped density according to DIN 53 194: 110 g/l

Average agglomerate particle size: 3 microns.

The silica gel Syloid 385 used in the examples has the following physical-chemical properties:

Particle size: 5 microns

BET-surface area: 400 m$^2$/g

Bulk density: 15 kg/100 l

Loss on heat: 6% pH: 3.

The silica gel Syloid 244 used in the examples has the following physical-chemical properties:

Particle size: 4 microns

BET-surface area: 300 m$^2$/g

Bulk density: 10 kg/100 l

Loss on heating: 7% pH: 7.

The Zeolite A added in the examples was produced according to German AS No. 26 51 436 (and related Strack U.S. application Ser. No. 846,017, filed Oct. 27, 1977).

The Zeolite X added in the examples was produced according to German Pat. No. 1 038 016 with subsequent grinding in a pinned disk mill.

The Zeolite Y added in the examples was produced according to German Pat. No. 1 098 929 with subsequent grinding in a pinned disk mill.

The Zeolite P added in the examples was produced according to French Pat. No. 1,213,628.

The hydroxysodalite added in the examples was produced from a Zeolite A according to German OS No.

24 47 021 by boiling for three days with NaOH (20% by weight). The product was filtered off, washed, dried and ground in a pinned disk mill.

Figure 2:
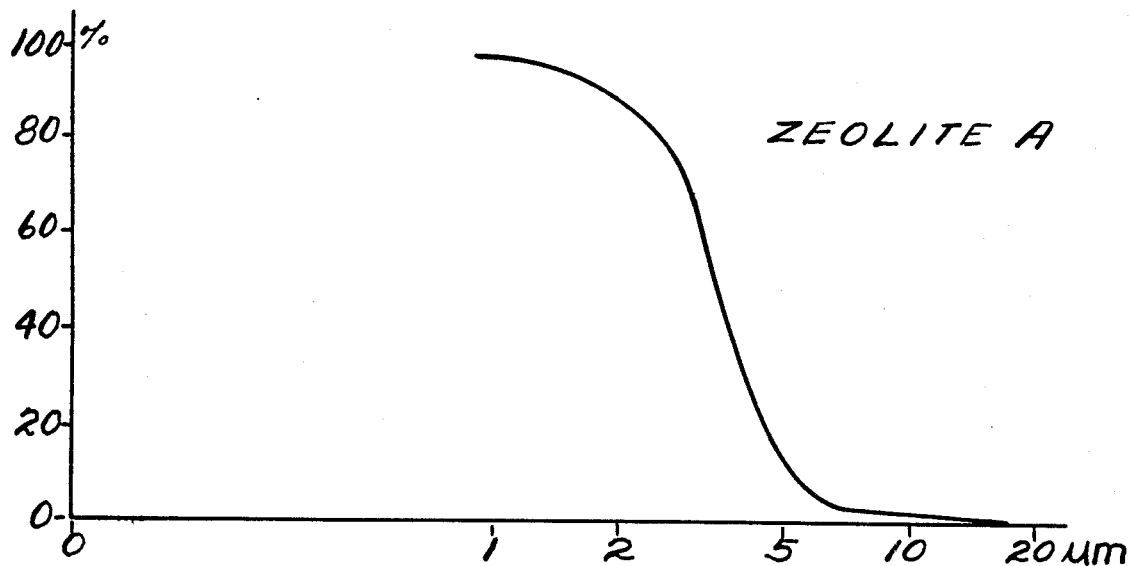
FIG. 2 is the graph of the particle size distribution of the zeolite A added in Examples 1, 2, 3 and 4.
Figure 3:
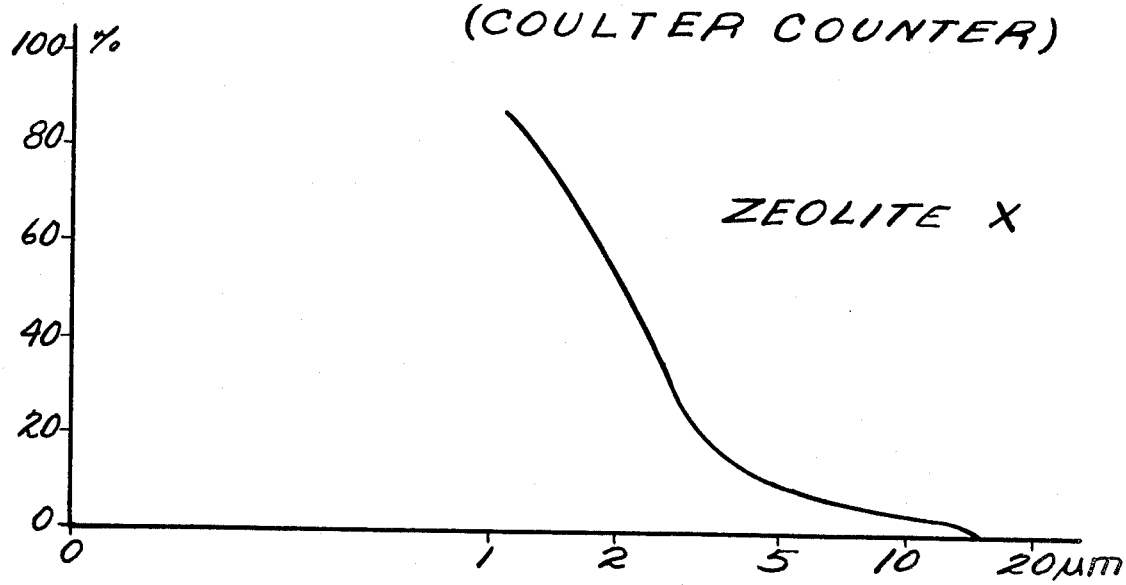
FIG. 3 is the graph of the particle size distribution of the zeolite X added in Example 3.
Figure 4:
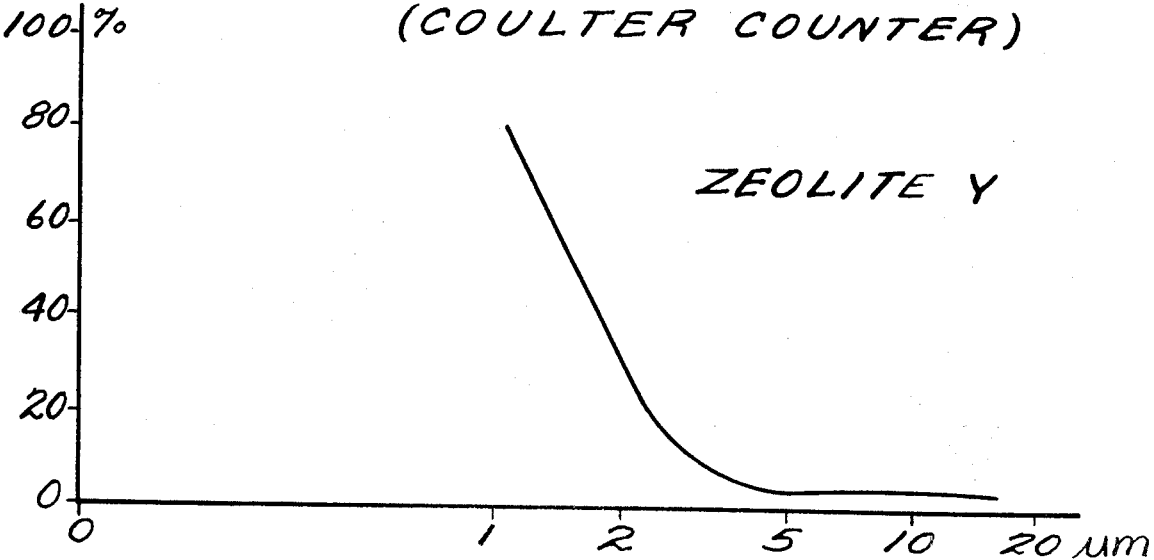
FIG. 4 is the graph of the particle size distribution of the zeolite Y added in Example 4.

As stated above the particle size distribution of the zeolites added ascertained by means of a Coulter-Counter are set forth in FIGS. 1 through 5.

The entire disclosure of German priority application P No. 28 33 675.6-43 is hereby incorporated by reference.

The terms "a polymer of ethylene" and "a polymer of propylene" are intended to include both homopolymers and copolymers with a copolymerizable material.

What is claimed is:

1. A thermoplastic mixture suitable for the production of a synthetic resin film having antiblocking properties comprising a thermoplastic synthetic resin and 0.05 to 70 weight % of the composition of a pulverulent zeolite.

2. A thermoplastic mixture according to claim 1 wherein the thermoplastic synthetic resin is a polymer of ethylene or a polymer of propylene.

3. A thermoplastic mixture according to claim 2 wherein the thermoplastic synthetic resin is polyethylene.

4. A thermoplastic mixture according to claim 1 containing 2 to 60 weight % of the zeolite.

5. A thermoplastic mixture according to claim 4 containing 20 to 60 weight % of the zeolite.

6. A thermoplastic mixture according to claim 1 containing 0.05 to 2 weight % of the zeolite.

7. A thermoplastic mixture according to claim 6 containing 0.05 to 1 weight % of the zeolite.

8. A thermoplastic mixture according to claim 1 wherein the pulverulent zeolite is Zeolite A.

9. A thermoplastic mixture according to claim 8 wherein the Zeolite A has the following particle size distribution by Coulter-Counter:
less than 15 microns: 99–100 weight %
less than 10 microns: 95–99 weight %
less than 1 micron: less than 5 weight %.

10. A thermoplastic mixture according to claim 8 wherein the thermoplastic synthetic resin is a polymer of ethylene or a polymer of propylene.

11. A thermoplastic mixture according to claim 1 wherein the pulverulent zeolite is Zeolite Y.

12. A thermoplastic mixture according to claim 11 wherein the Zeolite Y has the following particle size distribution by Coulter-Counter:
less than 15 microns: 96–100 weight %
less than 10 microns: 85–99 weight %
less than 1 micron: less than 20 weight %.

13. A thermoplastic mixture according to claim 11 wherein the thermoplastic synthetic resin as a polymer of ethylene or a polymer of propylene.

14. A thermoplastic mixture according to claim 1 wherein the pulverulent zeolite is Zeolite X.

15. The thermoplastic mixture according to claim 14 wherein the Zeolite X has the following particle size distribution by Coulter-Counter:
less than 15 microns: 96–100 weight %
less than 10 microns: 85–99 weight %
less than 1 micron: 20 weight %.

16. A thermoplastic mixture according to claim 14 wherein the thermoplastic synthetic resin is a polymer of ethylene or a polymer of propylene.

17. A thermoplastic mixture according to claim 1 wherein the pulverulent zeolite is Zeolite P.

18. A thermoplastic mixture according to claim 17 wherein the Zeolite P has the following particle size distribution by Coulter-Counter:
less than 15 microns: 99–100 weight %
less than 10 microns: 97–99 weight %
less than 1 micron: 20 weight %.

19. A thermoplastic mixture according to claim 17 wherein the thermoplastic synthetic resin is a polymer of ethylene or a polymer of propylene.

20. A thermoplastic mixture according to claim 1 wherein the pulverulent zeolite is hydroxysodalite.

21. A thermoplastic mixture according to claim 20 wherein the hydroxysodalite has the following particle size distribution by Coulter-Counter:
less than 15 microns: 99–100 weight %
less than 10 microns: 90–99 weight %
less than 1 micron: 10 weight %.

22. A thermoplastic mixture according to claim 20 wherein the thermoplastic synthetic resin is a polymer of ethylene or a polymer of propylene.

23. A thermoplastic mixture according to claim 1 wherein the thermoplastic synthetic resin is polyethylene or polypropylene.

24. A thermoplastic mixture according to claim 1 wherein the thermoplastic synthetic resin is a polyester, a polymer of ethylene or a polymer of propylene.

25. A thermoplastic mixture according to claim 1 wherein the pulverulent zeolite is zeolite A, Zeolite X, Zeolite Y or Zeolite P.

26. A thermoplastic mixture according to claim 25 wherein the pulverulent zeolite is a mixture of Zeolite X, and Zeolite P in the ratio of 80 to 5% zeolite X to 20 to 95% Zeolite P.

27. A thermoplastic mixture according to claim 26 wherein the thermoplastic synthetic resin is a polymer of ethylene or a polymer of propylene.

28. A thermoplastic mixture according to claim 1 wherein 96 to 100% by weight of the zeolite particles has a particle size by Coulter-Counter of less than 15 microns.

29. A thermoplastic mixture according to claim 28 wherein 85 to 99 weight % of the zeolite particles has a particle size by Coulter-Counter of less than 10 microns.

* * * * *

UNITED STATES PATENT AND TRADEMARK OFFICE
CERTIFICATE OF CORRECTION

PATENT NO. : 4,250,081

DATED : February 10, 1981

INVENTOR(S) : BODE, Rudolf; REISERT, Arthur; TURK, Gunter and STRACK, Hans

It is certified that error appears in the above—identified patent and that said Letters Patent is hereby corrected as shown below:

Column 10, Table 4, under the heading FK 310

"0" should be "10".

Signed and Sealed this

Nineteenth Day of May 1981

[SEAL]

Attest:

RENE D. TEGTMEYER

Attesting Officer

Acting Commissioner of Patents and Trademarks